US012632825B2

(12) United States Patent
Xu et al.

(10) Patent No.: US 12,632,825 B2
(45) Date of Patent: May 19, 2026

(54) HARDWARE CAPACITY MANAGEMENT IN A MULTI-CLOUD COMPUTING SYSTEM

(71) Applicant: VMware, Inc., Palo Alto, CA (US)

(72) Inventors: Emily Hong Xu, Palo Alto, CA (US); Rama Koteswari Sudireddi, Cupertino, CA (US); Arabinda Das, Bangalore (IN); Shrinivas Patil, Bagalkot (IN)

(73) Assignee: VMware LLC, Palo Alto, CA (US)

( * ) Notice: Subject to any disclaimer, the term of this patent is extended or adjusted under 35 U.S.C. 154(b) by 321 days.

(21) Appl. No.: 18/330,153

(22) Filed: Jun. 6, 2023

(65) Prior Publication Data

US 2024/0412158 A1    Dec. 12, 2024

(51) Int. Cl.
*G06Q 10/087* (2023.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 9,805,402 B1 * | 10/2017 | Maurer | ............... | G06Q 10/087 |
| 9,882,827 B2 * | 1/2018 | Fall | ........................ | H04L 47/70 |
| 2022/0207127 A1 * | 6/2022 | Young | ................... | H04L 9/3263 |

FOREIGN PATENT DOCUMENTS

WO    WO-2024063757 A1 *    3/2024    ......... H04L 41/0816

* cited by examiner

*Primary Examiner* — Garcia Ade
(74) *Attorney, Agent, or Firm* — Kim & Stewart LLP

(57)    ABSTRACT

An example method of managing hardware capacity in a multi-cloud computing system includes: obtaining, by a hardware inventory service executing in the multi-cloud computing system, hardware information for physical servers, in a public cloud, for which a customer has a subscription entitling bare-metal management of the physical servers; maintaining, by the hardware inventory service, an inventory of hardware capacity comprising a physical server pool that includes the physical servers; receiving, at the hardware inventory service, a request to consume the hardware capacity; and providing, by the hardware inventory service, a response to the request that identifies the physical server pool for deploying software to execute therein.

20 Claims, 8 Drawing Sheets

500

600

HARDWARE CAPACITY MANAGEMENT IN A MULTI-CLOUD COMPUTING SYSTEM

BACKGROUND

Cloud computing customers move through various business cycles, requiring them to expand and contract resources to meet business needs. A managed service provider provides one type of cloud solution. The managed service provider pre-purchases physical hardware from a vendor and allocates capacity across its customers. The managed service provider charges its customers for hardware, software, and service. For example, the managed service provider can provide a customer with a managed software-defined data center (SDDC) in which the customer can execute their workloads. Customer data center deployments for critical workloads need to ensure highly available infrastructure supporting elasticity that enables scaling as needed. Further, enough spare capacity needs to be available for lifecycle management operations (e.g., software upgrades, as well as software maintenance and like type "break-fix" operations). The managed service provider supplies the hardware capacity to support the scaling and lifecycle management needs of the SDDC. To the user, the hardware capacity appears to be "unlimited," as the customer only purchases the service with corresponding service level agreement (SLA) and not the underlying hardware. This notion of unlimited hardware capacity is not compatible with other currently trending models, such as Bring-Your-Own-Hardware (BYOH) models.

In a BYOH model, the customer procures the physical hardware. The managed service provider in turn provides software and service using the customer's hardware. Customer hardware can be distributed across multiple clouds in a multi-cloud system. For example, a customer can purchase hardware for an on-premises data center or a co-location data center (e.g., local cloud(s), distributed cloud(s), edge deployment(s)). A customer can purchase bare-metal Infrastructure-as-a-Service (IaaS) subscription(s) from vendors. A bare-metal IaaS subscription entitles a customer to complete use of physical hardware, including installation of hypervisors or host operating systems on physical servers. Bare-metal IaaS products differ from traditional IaaS products that entitle the customer to use virtualized hardware for which the customer is a tenant (among potentially other tenants).

In the BYOH model, the customer has a limited set of hardware capacity comprising the procured physical hardware. The managed service provider needs to have access to the customer's hardware capacity to ensure operation of auto-scaling and lifecycle management operations in deployed SDDCs, break-fix operations, and satisfaction of SLAs. The managed service provider also needs access to the customer's hardware capacity to notify the customer of the need for additional capacity. Ordering capacity can be time-consuming for the customer, particularly in local clouds and edge deployments where the customer must order and install the physical hardware.

SUMMARY

In an embodiment, a method of managing hardware capacity in a multi-cloud computing system is described. The method includes obtaining, by a hardware inventory service executing in the multi-cloud computing system, hardware information for physical servers, in a public cloud, for which a customer has a subscription entitling bare-metal management of the physical servers. The method includes maintaining, by the hardware inventory service, an inventory of hardware capacity comprising a physical server pool that includes the physical servers. The method includes receiving, at the hardware inventory service, a request to consume or release the hardware capacity. The method includes providing, by the hardware inventory service, a response to the request that identifies the physical server pool for deploying software to execute therein for releasing back to available hardware capacity in the inventory.

Further embodiments include a non-transitory computer-readable storage medium comprising instructions that cause a computer system to carry out the above method, as well as a computer system configured to carry out the above method.

DETAILED DESCRIPTION

Figure 1:
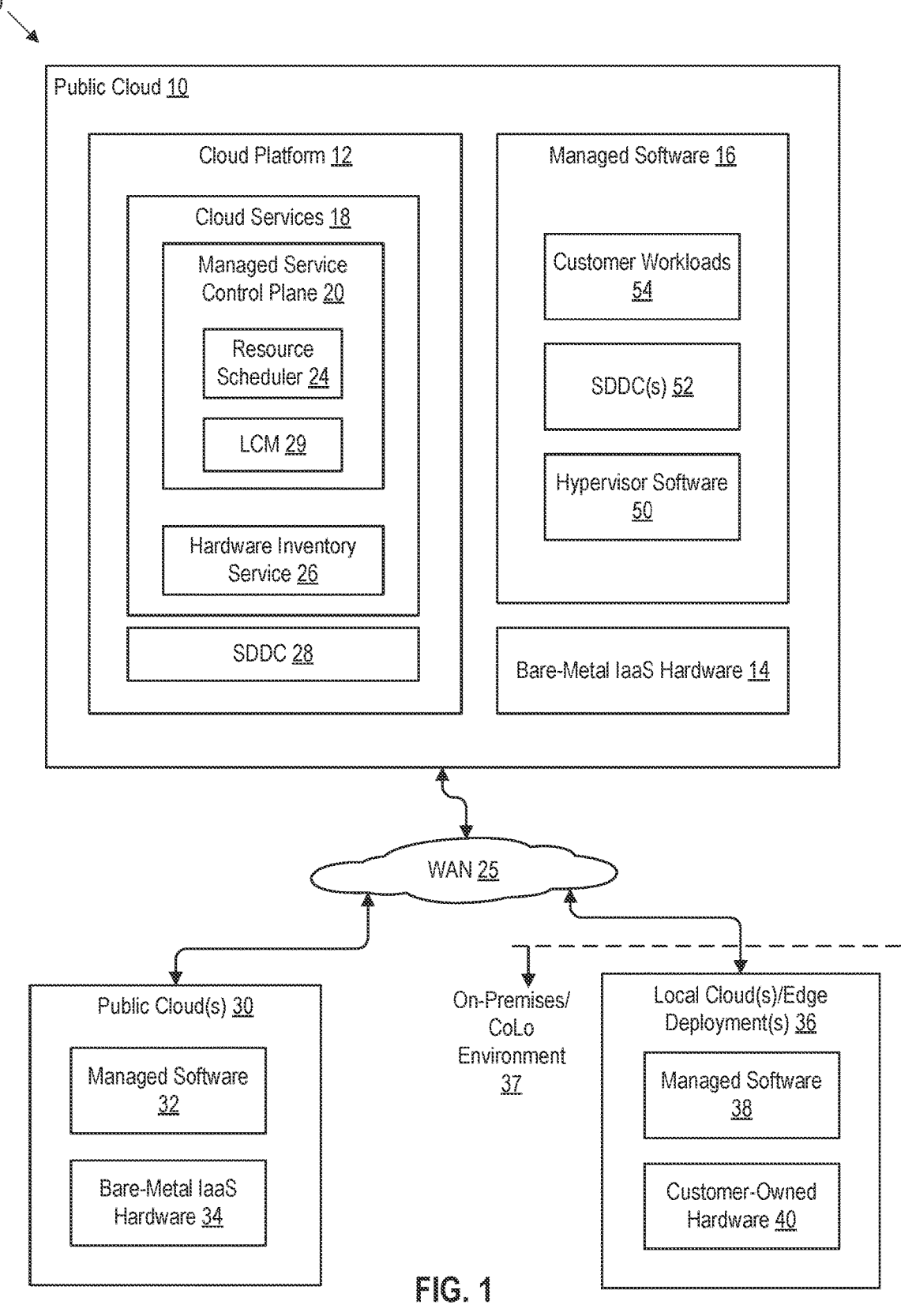
FIG. 1 is a block diagram depicting a multi-cloud computing system according to embodiments.

Hardware capacity management in a multi-cloud computing system is described. The multi-cloud computing system is distributed across one or more clouds. For example, the multi-cloud computing system can be distributed across multiple clouds, each operated by a different vendor. The cloud(s) of the multi-cloud computing system can include public cloud(s), as well as on-premises data centers, co-location data centers, and the like that provide local cloud(s), distributed cloud(s), and/or edge deployment(s). An edge deployment comprises an edge between a wide area network (WAN) (e.g., the public Internet) and a customer's data center. A customer procures physical hardware in the multi-cloud system. For a public cloud, the customer obtains a subscription for bare-metal IaaS hardware. That is, the customer purchases bare-metal hardware capacity from the public cloud vendor. For a local cloud or edge deployment, the user purchases and installs hardware in a data center (e.g., on-premises data center or co-location data center).

A managed service provider provides software and service for the customer using the customer's procured hardware. In embodiments, the customer interacts with a managed service control plane, supplied by the managed service provider, to deploy and manage SDDCs on hardware capacity comprising the customer's procured hardware. The managed service control plane cooperates with a hardware inventory service that manages the hardware capacity, which includes physical hardware supplied by various vendors. The hardware inventory service can manage the hardware capacity at various levels, such as an SDDC level, a customer's organization level (e.g., cross-SDDCs), the managed service provider level (e.g., a global capacity shared by the managed service provider's customers), and vendor levels (e.g., public cloud autoscaling services).

In embodiments, a customer registers the procured hardware with the hardware inventory service. The hardware inventory service is configured to add customer procured hardware to its inventory, such as physical servers. The customer can define pools of physical servers as hardware capacity that can be used for both workload capacity and spare capacity. The hardware inventory service can discover hardware information for the procured hardware from public clouds automatically given information describing the customer's subscriptions. Alternatively, the customer can directly input hardware information to the hardware inventory service. The hardware inventory service can define reservation policies for server pools that carve out reserved capacity. The hardware inventory service can service requests from the managed service control plane to obtain hardware capacity for SDDC deployments. The hardware inventory service can service requests from lifecycle management software to obtain reserve capacity for lifecycle operations. The hardware inventory service can service requests to obtain reserve capacity for break-fix operations. "Break-fix" operations are operations that remediate an SDDC in case of hardware/software failures. Remediation includes auto-remediation performed by software and manual remediation performed by a user. In a break-fix operation, hardware associated with a failure can be put into maintenance mode or otherwise taken offline and replaced with hardware from the reserve capacity. Once hardware/software failure is remediated, the hardware exits maintenance mode and is added back to available hardware capacity. Should insufficient hardware capacity exist for a capacity request, the hardware inventory service can attempt to augment capacity automatically using physical hardware from a global capacity (e.g., maintained by the managed service provider) or from vendor capacity (e.g., using a vendor's autoscaling service). The hardware inventory service can also notify a customer of the need for additional capacity. Embodiments of the techniques set forth herein are described below with respect to the drawings.

FIG. 1 is a block diagram depicting a multi-cloud computing system 100 according to embodiments. A multi-cloud computing system comprises a customer's computing system distributed across some combination of cloud computing systems, each of which can be a public cloud, a local cloud, or an edge deployment. As shown in the example of FIG. 1, a customer's computing system is distributed across a public cloud 10, public cloud(s) 30, and local cloud(s) and/or edge deployment(s) ("local cloud(s)/edge deployment(s) 36"). The customer's computing system comprises a cloud platform 12, managed software 16 executing on bare-metal IaaS hardware 14 in public cloud 10, managed software 32 executing on bare-metal IaaS hardware 34 in public cloud(s) 30, and managed software 38 executing on customer-owned hardware 40 in local cloud(s)/edge deployment(s) 36. Local cloud(s)/edge deployment(s) 36 can be located in on-premises data center(s) and/or co-location data center(s) ("on-premises/CoLo environment 37"). Public cloud 10, public cloud(s) 30, and local cloud(s)/edge deployment(s) 36 are connected to wide area network (WAN) 25, such as the public Internet.

In the example, cloud platform 12 executes in public cloud 10, but may execute in a separate cloud computing system from the customer's managed software. Cloud platform 12 is provided by a managed service provider. Cloud platform 12 includes cloud services 18 executing on an SDDC 28. SDDC 28 includes virtualized infrastructure of public cloud 10, such as virtual machines (VMs) and/or containers executing on hardware platforms of virtualized hosts. SDDC 28 can be part of the customer's computing system, e.g., execute on an IaaS product of public cloud 10 procured by the customer. Alternatively, cloud platform 12 can be an "as-a-service" product procured by the customer from the managed service provider.

The managed service provider provides software and service to the customer but does not procure physical hardware for the customer. Instead, the customer procures the physical hardware on which the software executes (e.g., a BYOH model). Customer-procured physical hardware comprises physical server, physical network, and physical storage resources. In the example of FIG. 1, the customer procures bare-metal IaaS hardware 14 in public cloud 10, bare-metal IaaS hardware 34 in public cloud(s) 30, and customer-owned hardware 40 in local cloud(s)/edge deployment(s) 36. Bare-metal IaaS hardware 14 comprises physical hardware of public cloud 10 to which the user has a subscription that entitles bare-metal management of the physical hardware (e.g., a bare-metal IaaS product procured from a vendor of public cloud 10). For physical servers in bare-metal IaaS hardware 14, the customer's subscription entitles the customer to install, update, remove the software executing directly on the server hardware platforms (e.g., hypervisor software or operating system (OS) software). Bare-metal IaaS hardware 34 is similar to bare-metal IaaS hardware 14 but procured by the customer from public cloud(s) 30 (e.g., public clouds provided by different vendors). Customer-owned hardware 40 comprises physical hardware owned, leased, or otherwise under direct control of the customer.

Figure 2:
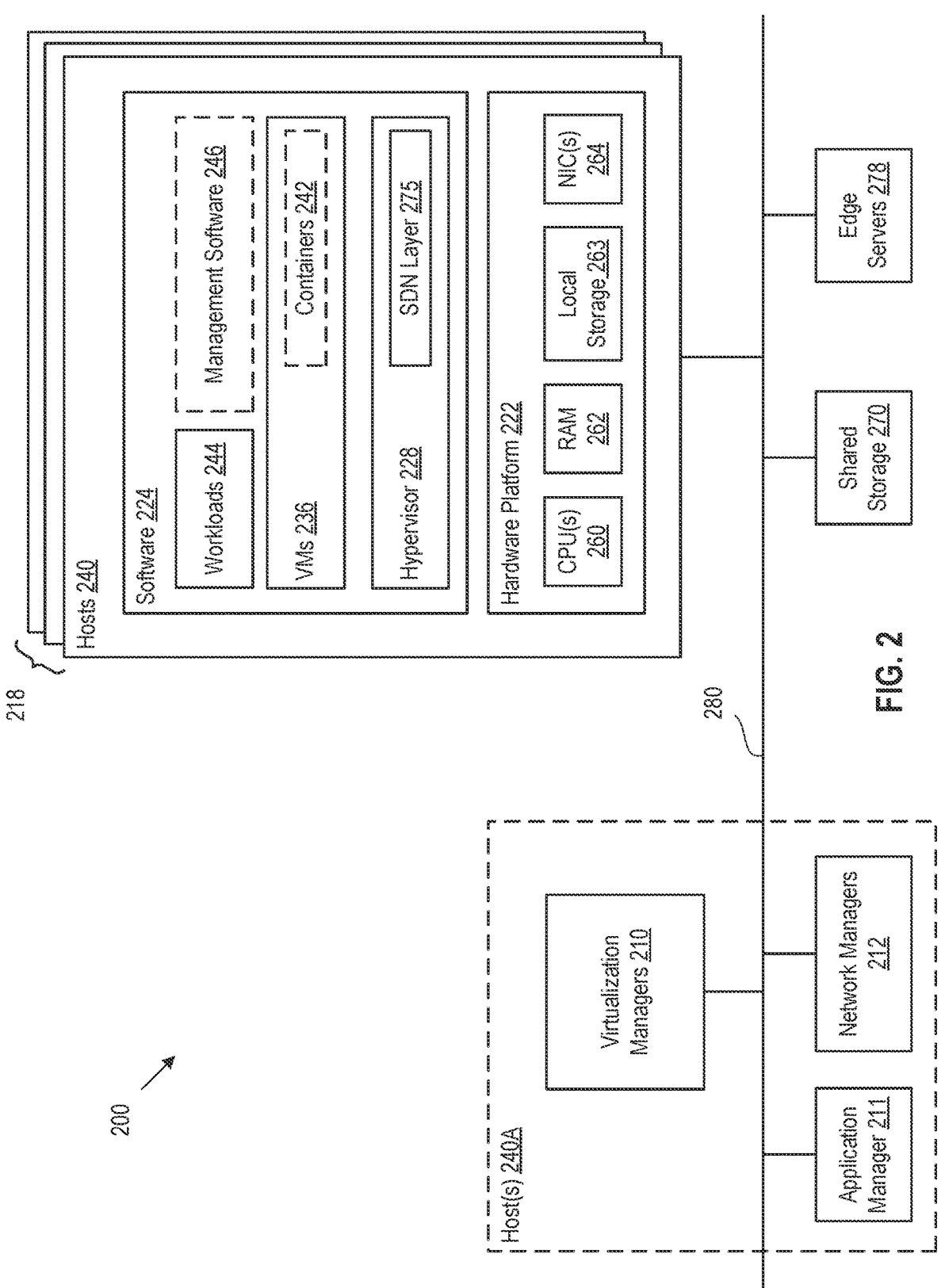
FIG. 2 is a block diagram depicting an SDDC according to embodiments.

Cloud services 18 include managed service control plane 20 and hardware inventory service 26. Managed service control plane 20, through customer interaction or autonomously, manages (e.g., creates, updates, deletes) software of the customer's computing system (referred to as "managed software"). In the example, the managed software includes managed software 16, managed software 32, and managed software 38. Each instance of managed software (e.g., managed software 16) can include hypervisor software 50, SDDC(s) 52, and customer workloads 54. For purposes of clarity, the details of managed software 32 and managed software 38, which are the same or similar to managed software 16, are omitted. Hypervisor software 50 comprises software executing directly on hardware platforms of physical servers in bare-metal IaaS hardware 14. Hypervisor software 50 enables the physical servers as virtualized hosts on which VMs and/or containers execute. SDDC(s) 52 include SDDC management software, such a virtualization manager, network manager, storage manager, application manager, and the like executing in VMs and/or containers. An example SDDC is shown in FIG. 2. Customer workloads 54 comprise business applications, services, etc. that execute in VMs and/or containers as managed by the SDDC management software.

Hardware inventory service 26 in cloud platform 12 manages an inventory of the customer's procured hardware, including bare-metal IaaS hardware 14, bare-metal IaaS hardware 34, and customer-owned hardware 40. The inventory stores objects representing physical servers, racks of physical servers, physical network devices (e.g., routers, switches, etc.), physical storage devices/systems (e.g., storage arrays), and the like. The inventory objects include hardware information describing the physical hardware, such as hardware type, hardware specifications, and the like, as well as status information for the physical hardware, such as running, rebooting, powered off, and the like. Through the inventory, hardware inventory service 26 manages hardware capacity of the customer's computing system. Cloud services 18 can interact with hardware inventory service 26 to request hardware capacity (e.g., deploying an SDDC), relinquish hardware capacity (e.g., decommission an SDDC), and query hardware capacity (e.g., identify consumed capacity, available capacity, inventory objects, etc.).

In the example, managed service control plane 20 includes a resource scheduler 24 and a lifecycle manager (LCM) 29. Resource scheduler 24 is configured to manage resources in the customer's computing system. Resource scheduler 24 can manage deployment and decommissioning of SDDCs and can send requests to hardware inventory service 26 for hardware capacity to consume or relinquish. Resource scheduler 24 can also perform scaling operations, such as scale-in or scale-out operations. For a scale-out operation, resource scheduler 24 expands the resources for an SDDC. For a scale-in operation, resource scheduler 24 reduces the resources for an SDDC. Resource scheduler 24 can autonomously perform scaling in response to the deployment/decommissioning of customer workloads 54 (auto-scaling) or in response to customer interaction. Resource scheduler 24 cooperates with hardware inventory service 26 to obtain hardware capacity for scale-out and relinquish hardware capacity for scale-in.

LCM 29 is configured to manage lifecycle operations for the customer's managed software. Lifecycle operations include software upgrades, software maintenance, software remediation, and the like type operations. To reduce downtime, LCM 29 utilizes reserved hardware capacity for some lifecycle operations, such as software upgrade. Hardware inventory service 26 can include hardware reservation policies that define reserved capacity. LCM 29 can cooperate with hardware inventory service 26 to consume and relinquish reserved hardware capacity for lifecycle operations.

FIG. 2 is a block diagram depicting an SDDC 200 according to embodiments. SDDC 200 or variants thereof can be used to support cloud services 18 (e.g., as SDDC 28) and customer workloads 54 (e.g., SDDC(s) 52 and SDDC(s) in managed software 32 and 38). SDDC 200 includes a cluster of hosts 240 ("host cluster 218") that may be constructed on hardware platforms such as x86 architecture platforms or ARM platforms of physical servers. For purposes of clarity, only one host cluster 218 is shown. However, SDDC 200 can include many of such host clusters 218. As shown, a hardware platform 222 of each host 240 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 240 to communicate with other devices through a physical network 280. Physical network 280 enables communication between hosts 240 and between other components and hosts 240.

In the embodiment illustrated in FIG. 2, hosts 240 access shared storage 270 by using NICs 264 to connect to network 280. In another embodiment, each host 240 contains a host bus adapter (HBA) through which input/output operations (Ios) are sent to shared storage 270 over a separate network (e.g., a Fibre Channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 240 include local storage 263 (e.g., hard disk drives, solid-state drives, etc.). Local storage 263 in each host 240 can be aggregated and provisioned as part of a virtual SAN, which is another form of shared storage 270.

Software 224 of each host 240 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed. Workloads 244 execute in VMs 236 either directly on guest operating systems or using containers 242.

Host cluster 218 is configured with a software-defined (SDN) layer 275 SDN layer 275 includes logical network services executing on virtualized infrastructure in host cluster 218. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, SDDC 200 includes edge servers 278 that provide an interface of host cluster 218 to WAN 25.

A virtualization manager 210 manages host cluster 218 and the virtualization layer therein. Virtualization manager 210 installs agent(s) in hypervisor 228 to add a host 240 as a managed entity. Virtualization manager 210 logically groups hosts 240 into host cluster 218 to provide cluster-level functions to hosts 240, such as VM migration between hosts 240 (e.g., for load balancing), distributed power management, dynamic VM placement according to affinity and anti-affinity rules, and high-availability The number of hosts 240 in host cluster 218 may be one or many. Virtualization manager 210 can manage more than one host cluster 218. SDDC 200 can include more than one virtualization manager 210, each managing one or more host clusters 218.

In an embodiment, SDDC 200 further includes a network manager 212. Network manager 212 orchestrates SDN layer 275. Network manager 212 installs additional agents in hypervisor 228 to add a host 240 as a managed entity. In an embodiment, SDDC 200 further includes application manager 211. Application manager 211 can orchestrate workloads 244. For example, application manager 211 can be a container orchestrator for managing workloads 244 using containers 242.

In embodiments, virtualization manager 210, network managers 212, and application manager 211 execute on hosts 240A, which are selected ones of hosts 240 and which form a management cluster. Virtualization manager 210, network managers 212, and application manager 211 can execute in VMs and/or containers on hosts 240A In other embodiments, any of virtualization managers 210, application manager 211, and network managers 212 can execute on non-virtualized physical servers having operating systems installed therein rather than hypervisors. In other embodiments, any of virtualization managers 210, network managers 212, and application manager 211 can execute in host cluster 218, rather than a separate management cluster (collectively management software 246)

Figure 3:
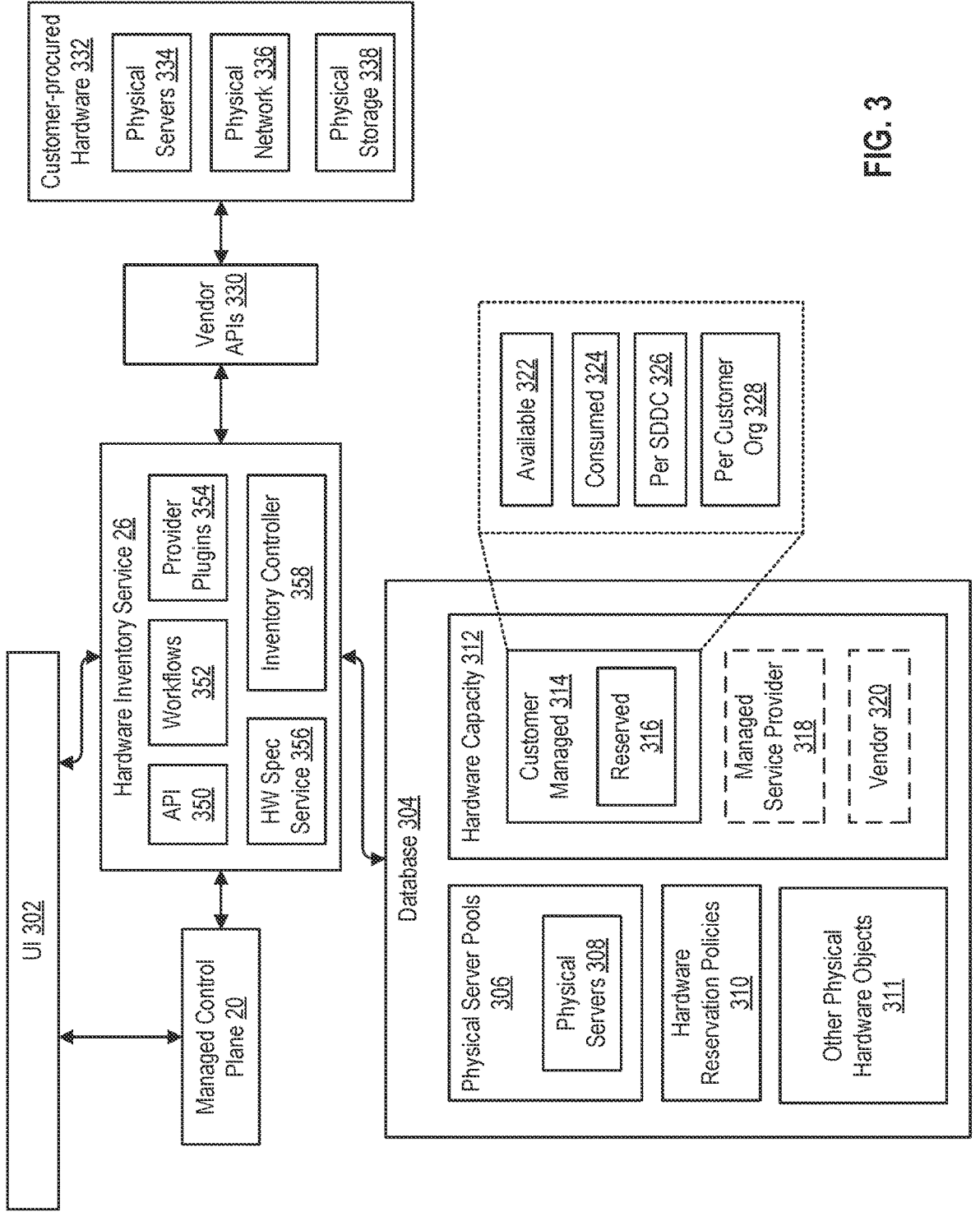
FIG. 3 is a block diagram depicting logical operation of a hardware inventory service according to embodiments.

FIG. 3 is a block diagram depicting logical operation of hardware inventory service 26 according to embodiments. The customer or operator of the managed service provider interacts with managed control plane 20 and hardware inventory service 26 through a user interface (UI) 302. UI 302 can invoke an application programming interface (API) of managed control plane 20 or an API 350 of hardware inventory service 26. In addition, managed control plane 20 can cooperate with hardware inventory service 26 through API 350. Hardware inventory service 26 also includes inventory controller 358, hardware specification service 356, workflows 352, and provider plugins 354. Inventory controller 358 processes requests received through API 350 and invokes workflows 352 depending on the requests Workflows 352 utilize support software, including hardware specification service 356 and provider plugins 354. Hardware inventory service 26 maintains a database 304 that stores an inventory of the customer's procured hardware.

Hardware inventory service 26 allows the customer to create physical server pools 306 having physical servers 308. Physical servers 308 are objects in database 304 that correspond to physical servers 334 in customer-procured hardware 332. Customer-procured hardware 332 includes any physical hardware to which the user is entitled to control (e g., bare-metal IaaS hardware and customer-owned hardware). Customer-procured hardware 332 includes physical servers 334, physical network devices 336, and physical storage devices 338. Hardware inventory service 26 maintains objects in database 304 for physical network devices 336 and physical storage devices 338 (other physical hardware objects 311).

API 350 includes APIs for registering physical servers 334 to create physical server objects (physical servers 308) and to create physical server pools 306 from physical servers 308. A customer can procure many physical servers across different vendors. Rather than inputting each physical server individually, the customer can input information related to subscriptions the customer has obtained. Hardware inventory service 26 can then invoke vendor APIs 330 to obtain hardware information from customer-procured hardware 332. Different vendors may have different procedures and APIs for obtaining hardware information from customer-procured hardware 332. Hardware inventory service 26 can include provider plugins 354, each corresponding to a different vendor. Each provider plugin 354 includes logic to interface with a vendor API 330 for its corresponding vendor and for obtaining the hardware information. Hardware inventory service 26, having collected hardware information for physical hardware being registered, can invoke hardware specification service 356 to verify that the physical hardware being registered complies with relevant hardware certifications. That is, the managed service provider can support hardware having certain specifications and can supply hardware certifications to ensure that the hardware being registered with hardware inventory service 26 is supported by managed control plane 20 and complies with the necessary specifications. Once registered, hardware inventory service 26 can keep the inventory up to date for the customer's subscriptions by periodically re-fetching hardware information from customer-procured hardware 332. In case there is not an automated way to obtain hardware information (e g., for local cloud hardware), the customer can submit the necessary hardware information through API 350. The user can enter hardware capacity information to hardware inventory service 26 directly through UI 302.

Hardware inventory service 26 manages hardware capacity 312 formed from physical server pools 306 and other physical hardware objects 311. Hardware capacity 312 includes customer managed capacity 314, which is supported by customer-procured hardware 332. The customer can invoke API 350 of hardware inventory service to define hardware reservation policies 310 to carve out reserved capacity 316 from customer managed capacity 314. Customer managed capacity 314 includes available capacity 322 and consumed capacity 324. Consumed capacity 324 comprises customer-procured hardware 332 on which managed software is deployed. Available capacity 322 comprises customer-procured hardware 332 on which managed software is not yet deployed. Customer managed capacity 314 can include per-SDDC capacity 326 and per-customer organization capacity 328. Per-SDDC capacity 326 includes, for example, a physical server pool 306 on which an SDDC is deployed. Per-customer organization capacity 328 comprises, for example, hardware capacity across various vendors for the entire customer computing system. The hardware capacity includes both workload capacity and spare capacity for use in LCM and break-fix operations.

Hardware capacity 312 can include other capacities that may be temporary. For certain operations, such as scale out operations, hardware inventory service 26 can augment hardware capacity 312 with managed server provider capacity 318 and/or vendor capacity 320. The managed service provider can maintain a global pool of physical hardware that it has procured from vendor(s). The managed service provider can provide some capacity from the global pool to the customer on-demand as managed service provider capacity 318. When the demand subsides, hardware inventory service 26 can relinquish managed service provider capacity 318 back to the global pool. A public cloud vendor can provide a service for on-demand physical hardware to which the customer can subscribe. The customer can provide that subscription information to hardware inventory service 26 through API 350. In case of demand, hardware inventory service 26 can invoke the vendor service and obtain vendor capacity 320 using the subscription. When the demand subsides, hardware inventory service 26 relinquishes vendor capacity 320.

For certain use cases of managed control plane 20, it is necessary to set aside reserved capacity 316. Such use cases include lifecycle management operations, such as software upgrades, as well as break-fix operations. The customer can define hardware reservation policies 310 that are applied to physical service pools 306 to establish reserved capacity 316. Hardware inventory service 26 only returns reserve capacity 316 in response to requests for that specific purpose (e.g., lifecycle management operations).

Figure 4:
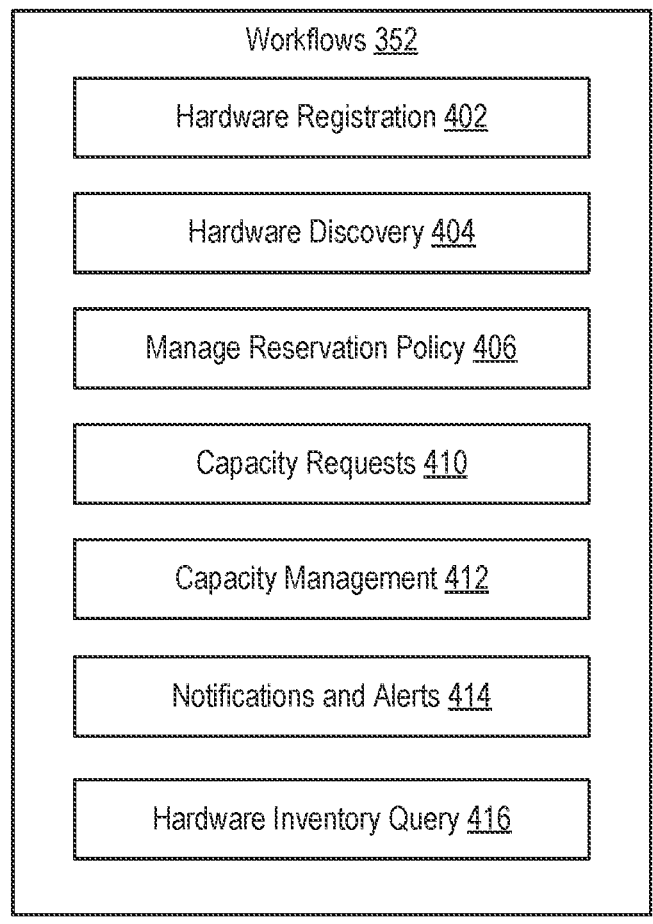
FIG. 4 is a block diagram depicting workflows of a hardware inventory service according to embodiments.

FIG. 4 is a block diagram depicting workflows 352 of hardware inventory service 26 according to embodiments. Workflows 352 include a hardware registration workflow 402, a hardware discovery workflow 404, a manage reservation policy workflow 406, a capacity request workflow 410, a capacity management workflow 412, notification and alert workflow 414, and a hardware inventory query workflow 416. Hardware inventory service 26 invokes hardware registration workflow 402 when on-boarding customer-procured hardware to the inventory for hardware capacity management. Hardware inventory service 26 invokes hardware discovery workflow 404 during hardware registration to automatically obtain hardware information from certain vendors using vendor APIs. Hardware inventory service 26 invokes manage reservation policy workflow 406 to create, update, delete hardware reservation policies. Hardware inventory service 26 invokes capacity requests workflow 410 in response to requests for capacity (e.g., requests to provision managed software, scaling requests, requests for reserved capacity for lifecycle management, etc.). Other capacity requests handled by workflow 410 include requests to relinquish capacity. Hardware inventory service 26 invokes capacity management workflow 412 to augment customer-managed capacity with additional capacity on-demand (e.g., from the global pool for managed service provider or from a vendor). Capacity management workflow 412 also identifies when the customer must procure additional physical hardware for additional capacity. Hardware inventory service 26 invokes notifications and alerts workflow 414 to generate notifications and alerts for the customer, such as when hardware capacity reaches a threshold, when additional hardware capacity must be purchased, when hardware capacity has been augmented, and the like. Hardware inventory service 26 invokes hardware inventory query workflow 416 in response to inventory queries by the customer.

Figure 5:
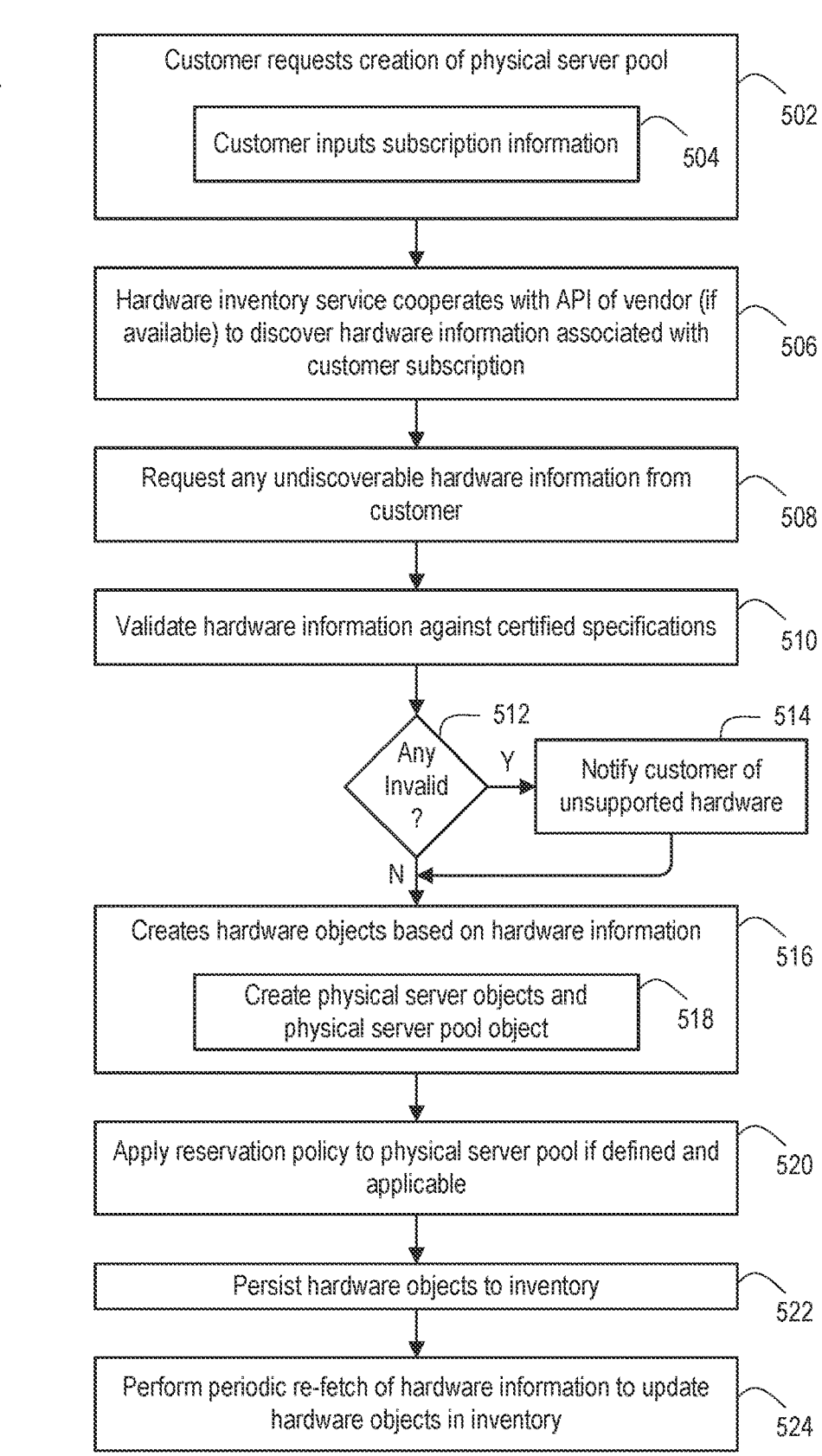
FIG. 5 is a flow diagram depicting a method of registering physical hardware with a hardware inventory service according to embodiments.

FIG. 5 is a flow diagram depicting a method 500 of registering physical hardware with hardware inventory service 26 according to embodiments. Method 500 begins at step 502, where the customer requests creation of a physical server pool comprising a plurality of physical servers. At step 504, the customer inputs subscription information that entitles use of physical hardware (e.g., a bare-metal IaaS product). At step 506, hardware inventory service 26 cooperates with a vendor API (if available) to discover hardware information associated with the customer subscription. The hardware information describes the physical servers for the physical server pool. If a vendor API is not available, the customer can submit the hardware information to hardware inventory service 26. Thus, at step 508, hardware inventory service 26 requests any undiscoverable hardware information from the customer (e.g., hardware information for local cloud-based hardware).

At step 510, hardware inventory service 26 validates the hardware information against certified specifications. At step 512, hardware inventory service 26 determines if any of the physical hardware does not comply with the certified specifications. If so, method 500 proceeds to step 514, where hardware inventory service 26 notifies the customer of the unsupported hardware. Otherwise, from both steps 512 and 514, method 500 proceeds to step 516.

At step 516, hardware inventory service 26 creates hardware objects in the inventory based on the hardware information. At step 518, hardware inventory service 26 creates physical server objects and a physical server pool object. At step 520, hardware inventory service 26 applies a reservation policy to the physical server pool if defined and applicable. The hardware reservation policy designates some of the physical servers as reserved capacity. At step 522, hardware inventory service 26 persists hardware objects to the inventory. At step 524, hardware inventory service 26 periodically re-fetches hardware information using the vendor API to update hardware objects in the inventory.

Figure 6:
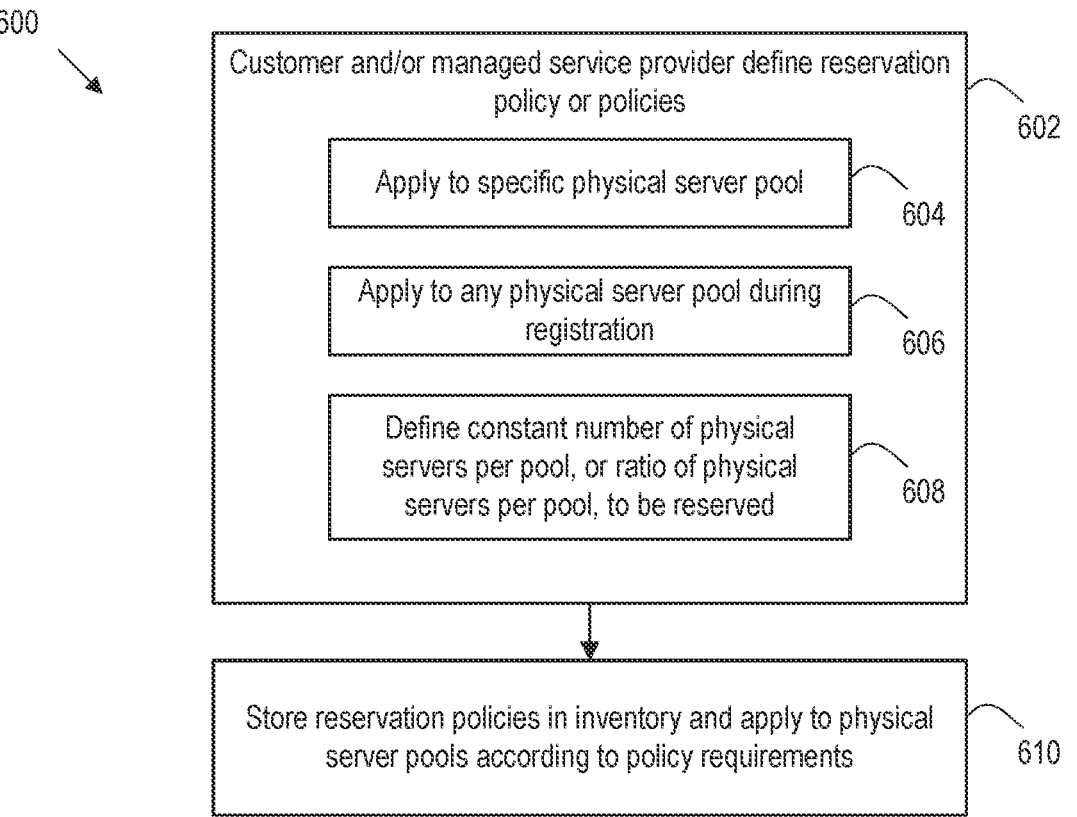
FIG. 6 is a flow diagram depicting a method of generating a hardware reservation policy in a hardware inventory service according to embodiments.

FIG. 6 is a flow diagram depicting a method 600 of generating a hardware reservation policy in a hardware inventory service 26 according to embodiments. Method 600 begins at step 602, where the customer or operator of managed service provider defines a reservation policy or policies. The hardware reservation policy dictates an amount of reserved capacity. At step 604, a reservation policy can be applied to a specific physical server pool. At step 606, a reservation policy can be applied to any physical server pool during registration. At step 608, a reservation policy can define a constant number of physical servers per pool, or a ratio of physical servers per pool, to be reserved. At step 610, hardware inventory service 26 stores the reservation policies in the inventory and applies them to physical server pools according to the policy requirements.

Figure 7:
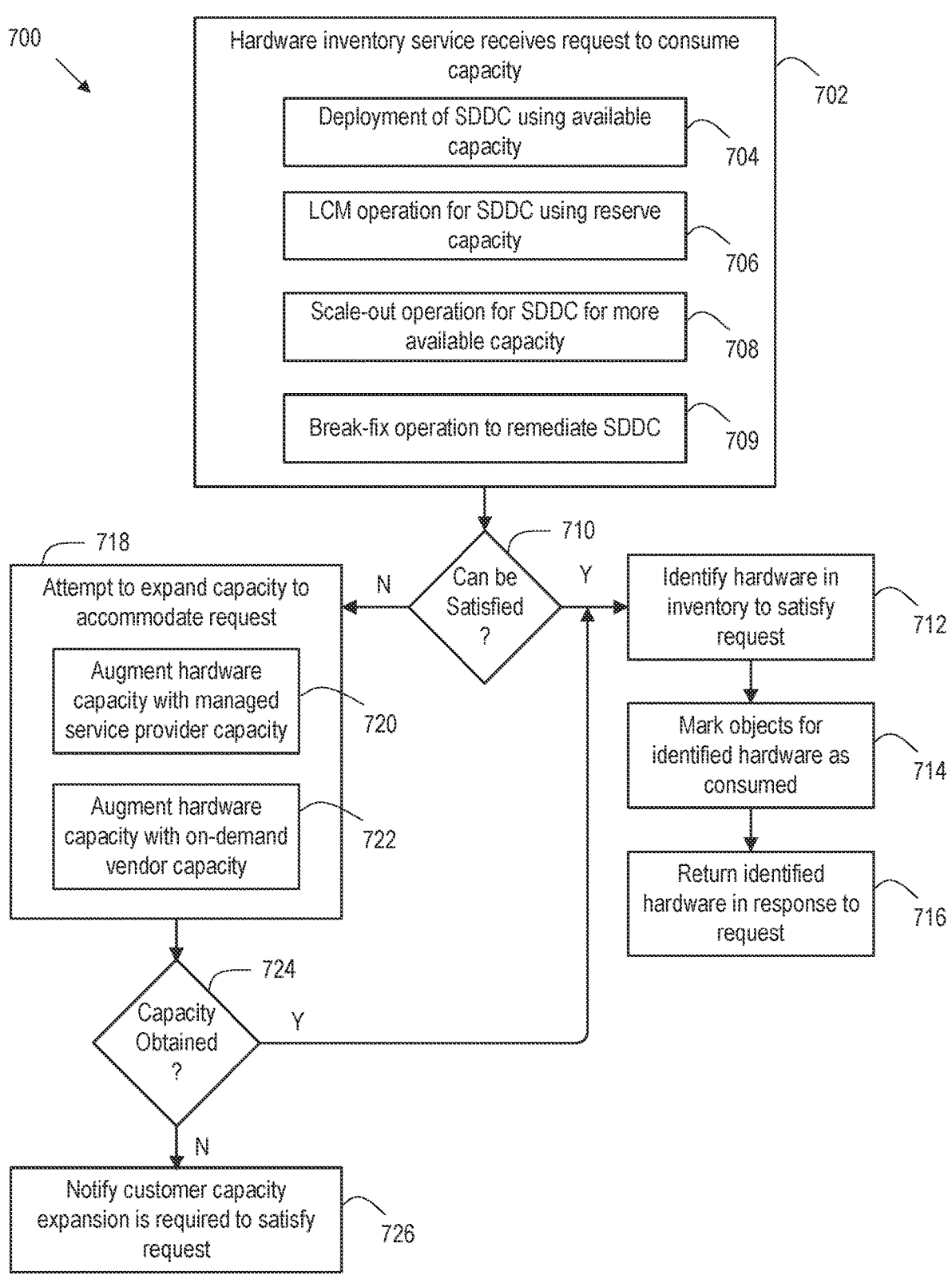
FIG. 7 is a flow diagram depicting a method of processing a request for hardware capacity at a hardware inventory service according to embodiments.

FIG. 7 is a flow diagram depicting a method 700 of processing a request for hardware capacity at a hardware inventory service 26 according to embodiments. Method 700 begins at step 702, where hardware inventory service 26 receives a request to consume hardware capacity. The request can be generated by the managed service control plane in response to deployment of an SDDC using available capacity (704). The request can be generated by the managed service control plane for a lifecycle operation to consume reserved capacity (706). The request can be generated by the managed service control plane for a scale-out operation for an SDDC to obtain more hardware capacity (708). The request can be generated by the managed service control plane for a break-fix operation to consume reserved capacity during remediation of an SDDC (709).

At step 710, hardware inventory service 26 determines if the request can be satisfied with customer-managed capacity. If so, method 700 proceeds to step 712. At step 712, hardware inventory service 26 identifies physical hardware in the inventory to satisfy the request (e.g., a physical server pool). At step 714, hardware inventory service 26 marks objects in the inventory for the identified hardware as consumed. At step 716, hardware inventory service 26 returns the identified hardware in response to the request.

If at step 710 there is insufficient customer-managed capacity for the request, method 700 proceeds to step 718. At step 718, hardware inventory service 26 attempts to expand the hardware capacity to accommodate the request. For example, at step 720, hardware inventory service 26 augments the hardware capacity with capacity from a global pool of the managed service provider. At step 722, hardware inventory service 26 augments the hardware capacity with on-demand vendor capacity according to a subscription of the customer. Hardware inventory service 26 can perform one or both of steps 720 and 722.

At step 724, hardware inventory service 26 determines if sufficient capacity has been obtained through augmentation. If so, method 700 proceeds to step 712. Otherwise, method 700 proceeds to step 726. At step 726, hardware inventory service 26 notifies the customer that capacity expansion is required to satisfy the request. The customer can then procure additional hardware, which can be added to the inventory through interaction by the customer or automatically using the discovery workflow described above. The request can then be retried.

Figure 8:
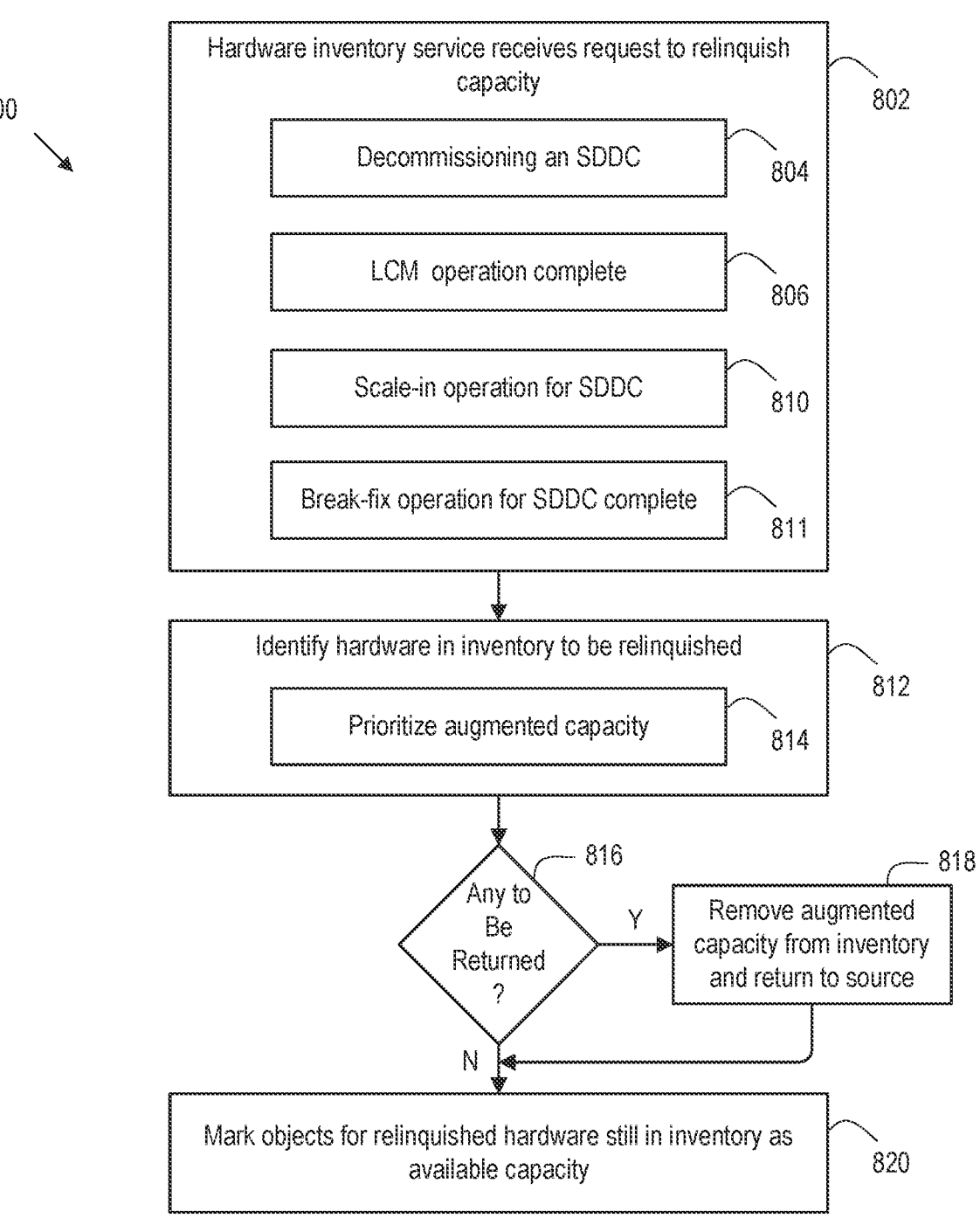
FIG. 8 is a flow diagram depicting a method of processing a request to relinquish hardware capacity at a hardware inventory service according to embodiments.

FIG. 8 is a flow diagram depicting a method 800 of processing a request to relinquish hardware capacity at a hardware inventory service 26 according to embodiments. Method 800 begins at step 802, where hardware inventory service 26 receives the request to relinquish hardware capacity. The request can be generated by the managed service control plane in response to decommissioning an SDDC (804). The request can be generated by the managed service control plane in response to completion of a lifecycle operation that consumed reserve capacity (806). The request can be generated by the managed service control plane in response to a scale-in operation for an SDDC (810). The request can be generated by the managed service control plane in response to completion of a break-fix operation that consumed reserve capacity (811).

At step 812, hardware inventory service 26 identifies hardware in the inventory to be relinquished based on the request. At step 814, hardware inventory service 26 prioritizes any augmented capacity to relinquish first. At step 816, hardware inventory service 26 determines if any augmented capacity is to be returned. If so, method 800 proceeds to step 818. At step 818, hardware inventory service 26 removes the augmented capacity from the inventory and returns it to the source. From both steps 816 and 818, method 800 proceeds to step 820. At step 820, hardware inventory service 26 marks the objects for the relinquished hardware still in the inventory as available capacity.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The term computer readable medium, including non-transitory computer readable medium, refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any order of operation unless explicitly stated in the claims.

Boundaries between components, operations, and data stores are arbitrary, and operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing hardware capacity in a multi-cloud computing system, comprising:
obtaining, by a hardware inventory service executing in the multi-cloud computing system, hardware information for physical servers, in a public cloud, for which a customer has a subscription entitling bare-metal management of the physical servers;
maintaining, by the hardware inventory service, an inventory of hardware capacity comprising a physical server pool that includes the physical servers;
receiving, at the hardware inventory service, a request to consume the hardware capacity;
providing, by the hardware inventory service, a response to the request that identifies the physical server pool for deploying software to execute therein; and
deploying, by the hardware inventory service, the software to execute in the physical server pool as identified, the software including a hypervisor to execute on each of the physical servers in the physical server pool.

2. The method of claim 1, wherein the hardware inventory service receives the request from a managed service control plane and the software comprises a software-defined data center (SDDC) managed by the managed service control plane for the customer.

3. The method of claim 2, further comprising:
receiving, at the hardware inventory service, a hardware reservation policy that dictates an amount of reserved capacity of the hardware capacity;
wherein the SDDC is deployed using the hardware capacity other than the reserved capacity.

4. The method of claim 1, wherein the hardware capacity includes reserved capacity in the physical server pool, wherein the hardware inventory service receives the request from a managed service control plane for a lifecycle management (LCM) operation or a break-fix operation in the multi-cloud computing system, and wherein the software is deployed by the managed service control plane in the reserved capacity.

5. The method of claim 1, wherein the step of obtaining comprises:
receiving, from the customer, information describing the subscription; and
invoking, by the hardware inventory service, an application programming interface (API) of the public cloud to obtain the hardware information.

6. The method of claim 1, further comprising:
determining, by the hardware inventory service, that the physical servers of the hardware capacity are insufficient for the request; and
augmenting, by the hardware inventory service, the hardware capacity with additional capacity comprising additional physical servers added to the physical server pool.

7. The method of claim 6, wherein the additional capacity is provided by a managed service provider to the customer and the additional physical servers are disposed in the public cloud for which the managed service provider has a subscription entitling bare-metal management of the additional physical servers.

8. The method of claim 6, wherein the additional capacity is provided by a vendor of the public cloud to the customer based on a subscription by the customer to a scaling service of the public cloud.

9. The method of claim 1, further comprising:

determining, by the hardware inventory service, that the physical servers of the hardware capacity are insufficient for the request;

notifying the customer that additional capacity is needed to perform the request;

obtaining, by the hardware inventory service, hardware information for additional physical servers, in the public cloud, for which the customer has added to the subscription; and adding, by the hardware inventory service, the additional physical servers to the physical server pool to expand the hardware capacity with the additional capacity.

10. The method of claim 1, further comprising:

validating, by the hardware inventory service, the hardware information for the physical servers against a hardware certification.

11. A non-transitory computer readable medium comprising instructions to be executed in a computing device to cause the computing device to carry out a method of managing hardware capacity in a multi-cloud computing system, comprising:

obtaining, by a hardware inventory service executing in the multi-cloud computing system, hardware information for physical servers, in a public cloud, for which a customer has a subscription entitling bare-metal management of the physical servers;

maintaining, by the hardware inventory service, an inventory of hardware capacity comprising a physical server pool that includes the physical servers;

receiving, at the hardware inventory service, a request to consume the hardware capacity;

providing, by the hardware inventory service, a response to the request that identifies the physical server pool for deploying software to execute therein; and deploying, by the hardware inventory service, the software to execute in the physical server pool as identified, the software including a hypervisor to execute on each of the physical servers in the physical server pool.

12. The non-transitory computer readable medium of claim 11, wherein the hardware inventory service receives the request from a managed service control plane and the software comprises a software-defined data center (SDDC) managed by the managed service control plane for the customer.

13. The non-transitory computer readable medium of claim 11, wherein the hardware capacity includes reserved capacity in the physical server pool, wherein the hardware inventory service receives the request from a managed service control plane for a lifecycle management (LCM) operation or a break-fix operation in the multi-cloud computing system, and wherein the software is deployed by the managed service control plane in the reserved capacity.

14. The non-transitory computer readable medium of claim 11, further comprising:

determining, by the hardware inventory service, that the physical servers of the hardware capacity are insufficient for the request; and augmenting, by the hardware inventory service, the hardware capacity with additional capacity comprising additional physical servers added to the physical server pool.

15. A computing system, comprising:

a public cloud of a multi-cloud computing system, the public cloud including physical servers for which a customer has a subscription entitling bare-metal management of the physical servers;

a hardware inventory service, executing in the public cloud, configured to:

obtain hardware information for the physical servers;

maintain an inventory of hardware capacity comprising a physical server pool that includes the physical servers;

receive a request to consume the hardware capacity;

provide a response to the request that identifies the physical server pool for deploying software to execute therein; and deploy the software to execute in the physical server pool as identified, the software including a hypervisor to execute on each of the physical servers in the physical server pool.

16. The computing system of claim 15, wherein the hardware inventory service receives the request from a managed service control plane and the software comprises a software-defined data center (SDDC) managed by the managed service control plane for the customer.

17. The computing system of claim 15, wherein the hardware capacity includes reserved capacity in the physical server pool, wherein the hardware inventory service receives the request from a managed service control plane for a lifecycle management (LCM) operation or a break-fix operation in the multi-cloud computing system, and wherein the software is deployed by the managed service control plane in the reserved capacity.

18. The computing system of claim 15, wherein the hardware inventory service is configured to:

receive, from the customer, information describing the subscription; and invoke an application programming interface (API) of the public cloud to obtain the hardware information.

19. The computing system of claim 15, wherein the hardware inventory service is configured to:

determine that the physical servers of the hardware capacity are insufficient for the request; and augment the hardware capacity with additional capacity comprising additional physical servers added to the physical server pool.

20. The computing system of claim 19, wherein the additional capacity is provided by a managed service provider to the customer and the additional physical servers are disposed in the public cloud for which the managed service provider has a subscription entitling bare-metal management of the additional physical servers.

* * * * *